March 8, 1960     A. J. KATZ     2,928,085
RADIO ALTIMETER SYSTEMS
Filed Feb. 6, 1957     4 Sheets-Sheet 1
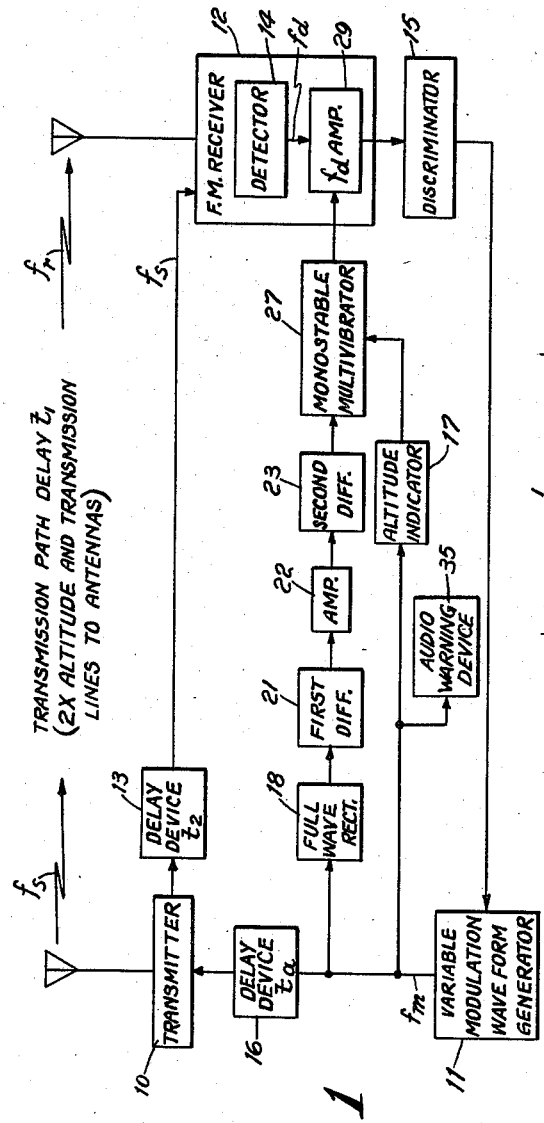
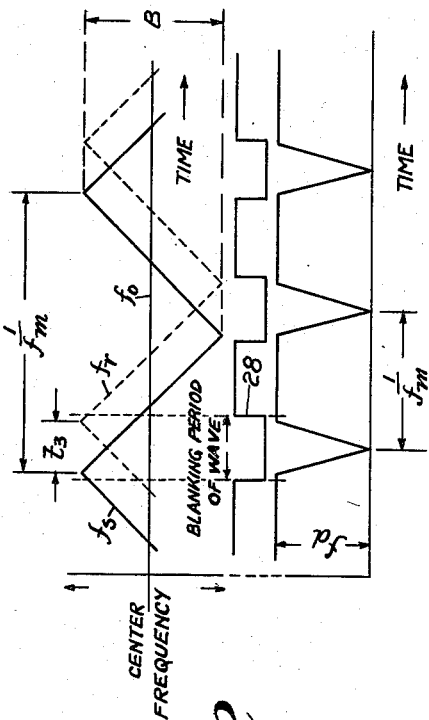
Inventor
ARTHUR J. KATZ
By
Attorney Inventor
ARTHUR J. KATZ
By Percy L. Lentz
Attorney Inventor
ARTHUR J. KATZ
By
Attorney March 8, 1960 A. J. KATZ 2,928,085
RADIO ALTIMETER SYSTEMS
Filed Feb. 6, 1957 4 Sheets-Sheet 4

$f_d' = f_d - f_v$

Inventor
ARTHUR J. KATZ
By
Attorney

United States Patent Office 2,928,085
Patented Mar. 8, 1960

2,928,085

RADIO ALTIMETER SYSTEMS

Arthur J. Katz, Bloomfield, N.J., assignor to International Telephone and Telegraph Corporation, Nutley, N.J., a corporation of Maryland Application February 6, 1957, Serial No. 638,626

4 Claims. (Cl. 343—14)

This invention relates to distance measuring systems employing radio wave reflection and more especially it relates to radio altimeters.

A principal object of the invention is to provide a more reliable radio altimeter or distance measuring device.

Another object is to provide a radio altimeter which is substantially free from the "step error" which exists in known kinds of frequency modulated altimeters.

A further object is to provide a non-quantized radio distance measuring device of the frequency modulation kind, wherein a distance indicating signal varies with the distance measured in a continuous manner, thus enabling the system to be reliably employed even for relatively short distances.

A feature of the invention involves detection of the frequency difference between the locally transmitted wave and the received wave after reflection from earth or other object, and means for automatically maintaining the frequency difference at a predetermined finite non-zero value, whereby measurements of high reliability for relatively short distances are obtainable.

Another feature relates to a radio altimeter of the frequency modulation kind wherein the radio wave is swept in frequency over a predetermined range, so that the curve relating frequency and time over a complete cycle may be either in the form of an isosceles triangle, a sinusoidal waveform, a sawtooth wave or other symmetrical or non-symmetrical waveform wherein the slope of the leading and/or trailing edges thereof is automatically varied in accordance with the distance to be measured, whereby the frequency difference between the transmitted and reflected waves is automatically maintained at a predetermined finite value as distinguished from a variable or zero value.

Other features and advantages will appear from the ensuing descriptions, the appended claims and the attached drawings.

The conventional frequency modulation altimeter such for example as described at pages 136 to 141 of the textbook "Radar Aids to Navigation" (M.I.T. Radiation Laboratories Series, No. 2, published by McGraw-Hill Book Co. Inc., New York) consists basically of a frequency modulated radio transmitter, a frequency modulation receiver employing a balanced mixer detector, an audio amplifier, and a frequency counter. In such known systems the output of the receiver is an audio frequency signal which varies over the repetition cycle of the modulation envelope of the transmitted radio wave, and the audio frequency averages out to an amount which is proportional to the altitude or distance to be measured. The frequency counter in such a system can only register zero crossings which gives rise to the well known "step error." The step error appears as changes in indicated height by increments of an amount which is called the critical distance. There is also a fluctuation which occurs for each one-eighth wavelength of the transmitted frequency. As a result the output varies back and forth by an amount corresponding to the critical distance for each increase in altitude equivalent to one-eighth wavelength of the transmitted wave and it increases with altitude in steps corresponding to the critical distance.

In accordance with the present invention, the conventional frequency modulated altimeter system is modified by inserting a frequency discriminator and a variable modulation waveform generator between the transmitter and the receiver mixer, whereby the frequency difference between the waves received over the path of unknown transmission time delay and the waves received over the link of known transmission time delay, is always maintained at a predetermined finite value which is preferably different from zero, especially when relatively low altitudes are being measured.

The slope of the waveform of the variable modulation generator is used as an indication of the distance being measured.

In the drawing which shows by way of example a preferred form of the invention:

Fig. 1 is a schematic block diagram of a system embodying this invention; and

Fig. 2 to 9 are graphs used in explaining the invention.

Figure 3:
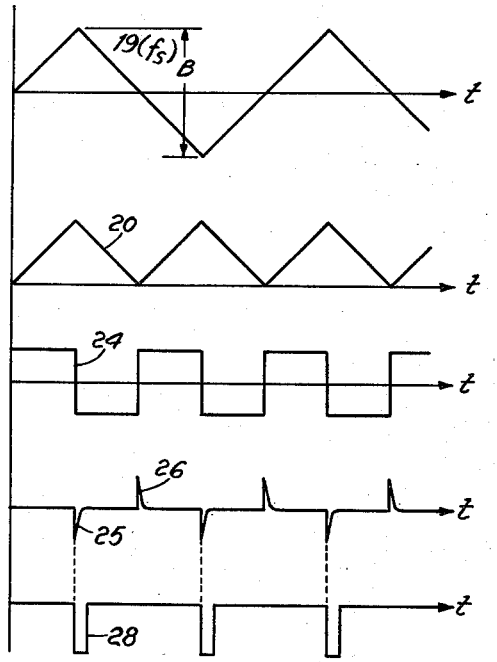

Referring to Fig. 1, block 10 represents any well-known frequency modulated radio transmitter such as is conventionally used in frequency modulated altimeters. The transmitter is capable of having its transmitter frequency swept over a predetermined range, for example from 420 to 460 megacycles per second. The frequency of the transmitted wave is swept rapidly at a constant rate by any well-known variable modulation waveform generator 11. Preferably and in accordance with the invention, the output of generator 11 modulates the transmitted frequency so as to provide a sweep frequency characteristic in the form of an isosceles triangle, a sinusoidal waveform, a sawtooth or other symmetrical or non-symmetrical waveform. In the graph of Fig. 2 the transmitted frequency is shown to vary in time according to regularly recurrent isosceles triangle. This is referred to herein as the sweep frequency characteristic, the slope and base width or height of which can be automatically controlled.

In the case of an altimeter the reflected wave of any given instantaneous frequency is delayed in accordance with the altitude of the aircraft, so that when it is received on the aircraft after the delay, the transmitter at that particular instant is generating a different frequency wave. According to the invention, the generated wave of the transmitter 10 is transmitted from the aircraft to the earth or other object and is also simultaneously transmitted to the receiver 12 over a local link 13 of known transmission time delay. The local wave and the reflected wave are compared to produce a difference frequency $f_d$. The rate at which the transmitted frequency varies is determined by the slope of the modulating waveforms so that the elapsed time ($t_3$, Fig. 2) between the two waves may be determined accordingly.

The wave transmitted over the local link 13 is indicated in the drawing as $f_s$. The time delay in this local link is, of course, known and fixed. The other path is the transmission and reflection path from the aircraft to and from the earth or other object. This reflected wave is identified in the drawing as $f_r$.

The receiver 12 is of known construction, usually incorporating a balanced detector 14 whereby the waves $f_s$ and $f_r$ are mixed to produce a control signal $f_d$ which represents the frequency difference therebetween. In accordance with the present invention, the system is so arranged that this frequency difference $f_d$ is automatically maintained at a predetermined fixed value instead of being variable as in the conventional systems. This result is obtained by changing the slope of the sweep frequency characteristic of the transmitted waves. This change in slope can be effected either by changing the recurrence frequency of the sweep characteristic or by changing the peak-to-peak excursion of the sweep frequency characteristic. For that purpose the signal $f_d$ is applied to any well-known frequency discriminator 15 which produces at its output a direct current signal whenever the signal $f_d$ departs from its predetermined finite value. As is well known, such a discriminator produces a direct current of one polarity when the frequency $f_d$ is above its pre-assigned value, and a direct current of the opposite polarity when $f_d$ is below its pre-assigned frequency value.

The proper polarity direct current signal from discriminator 15 is then used to control the variable modulation waveform generator 11 whose output ($f_m$) controls the frequency sweep characteristic of the transmitter 10. In one form of this invention this may be done through an intervening delay device 16. The generator 11 may be of any conventional kind which generates a waveform whose frequency may be in the region of, for example, 120 cycles per second. The generator 11 is also connected at its output to any well-known frequency meter 17 which indicates the frequency of the generator 11 necessary to maintain the frequency difference $f_d$ constant. The indications on meter 17 are calibrated in terms of distance or altitude as desired. In the form of the invention which uses delay device 16, the output waveform $f_s$ of generator 11 is also applied to a full wave rectifier 18. This wave, as previously assumed, may be of an isosceles triangular form, and is illustrated at 19 in Fig. 3. The output of the rectifier 18 is indicated by wave 20 which is applied to a first differentiator 21 then through an amplifier 22 to a second differentiator 23. The output of the first differentiator is indicated by wave 24 and the output of the second differentiator is indicated by the pulses 25, 26. These pulses are applied to a monostable multivibrator 27 to which is also applied the bias voltage derived from the altitude indicator 17 for the purpose of controlling the duration of the multivibrator output. The multivibrator output provides a waveform having portions 28 which are utilized in the amplifier 29 to blank the amplifier during the period $t_3$, Fig. 2. The delay device 16, Fig. 1, is so selected that the blanking begins just before the occurrence of the peaks 30 of the waveform 19 ($f_s$) and terminates just after the occurrence of the peaks 31 of the reflected waveform $f_r$, Fig. 2. The duration of the blanking interval may be kept constant at a value greater than the value of $t_3$ corresponding to the maximum altitude (or distance) to be measured, or alternately, it may be controlled by the altitude (or distance) indication to be just longer than the $t_3$ existing at the time. The blanking signal disconnects the discriminator 15 from the output of the detector 12. It should be understood, however, that the blanking feature including elements 16, 18, 21, 22, 23 and 27 may be omitted where $t_3$ is sufficiently small compared to $$\frac{1}{2f_m} \text{ or } \frac{1}{f_d}$$

that is, where $t_3$ is in the order of about $\frac{1}{100}$ of the smaller of the two.

Let it be assumed first that the transmitter 10 is modulated with an isosceles triangular wave shape. The relation of $h$ to the other parameters of the system can be found from the fact that $$t_3 = \frac{2h}{c}$$

where $h$ is the distance, or altitude, to be measured and $c$ is the velocity of propagation of electromagnetic radiation ($984 \times 10^6$ ft. per sec.). As may be seen from Fig. 2:

$$t_3 = \frac{f_d}{2f_m B} \text{ so that } h = \frac{c}{4} \frac{f_d}{f_m B}$$

However, if $f_d$ is to be maintained at zero, then $$t_3 = \frac{1}{f_m}$$

so that $$h = \frac{c}{2f_m}$$

In either case $f_m$ is the recurrence frequency of the modulating waveform from the device 11, and B is the peak-to-peak excursion of the transmitted frequency. The quantity $f_d$ is the difference between $f_s$ and $f_r$ at any given time.

In conventional systems, the distance or altitude is indicated by $f_d$ while $f_m$ and B are held constant. The indicated $f_d$ can change only in steps of $2f_m$, which corresponds to altitude increments of $$\frac{c}{2B}$$

This is called the "step error" or "critical distance." (If $B=30$ M c.p.s., this increment is 16.4 ft.) The indicated altitude also changes back and forth by this same increment for each one-eighth wavelength change in actual altitude.

In the system which is the subject of this invention, $f_d$ is held constant, and altitude or distance is a function of either $f_m$ or B, which vary in a continuous manner so that the step error does not exist.

If the system is arranged so that $f_d$ is zero at all times, then $$h = \frac{c}{2f_m}$$

This has the advantage that $h$ is independent of B, thus reducing the importance of keeping the frequency excursion constant. However, for relatively small distances, for example 1000 feet or less, $f_m$ must be so high as to cause difficulty in practice. Also, the control of $f_m$ would be troublesome in that there would be difficulty in determining instantaneously and continuously the sign of the correction to be applied to $f_m$ to keep $f_d$ equal to zero. These latter difficulties are eliminated according to the invention when the system is arranged so that $f_d$ is maintained instead, at some finite non-zero value.

Since the quantity used to indicate distance is one which varies inversely with distance, resolution of indication is better for smaller distances, which is where better resolution is desired.

Referring to Fig. 2 there is shown curves $f_s$ and $f_r$ for one particular altitude. Each of these curves has a peak-to-peak excursion of B and a center frequency $f_0$. The reflected wave $f_r$ has a delay time $t_3$ with respect to the transmitted wave $f_s$. The curve $f_d$ is of constant amplitude except during periods $t_3$ when it goes to zero. If $t_3$ is an appreciable fraction of $$\frac{1}{f_m}$$

the effect fo these dips may be removed by blanking pulse 28.

Figure 4:
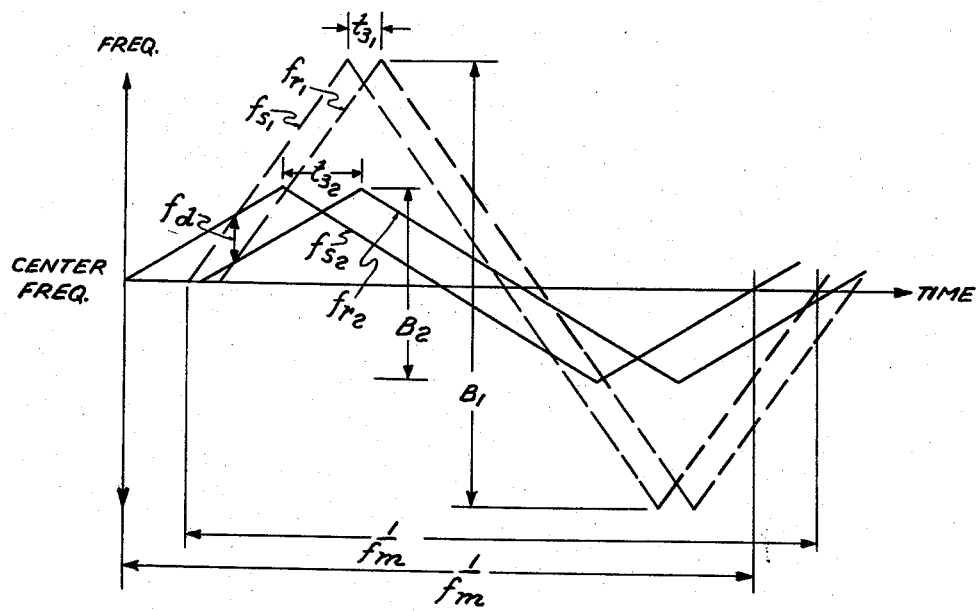
Figure 5:
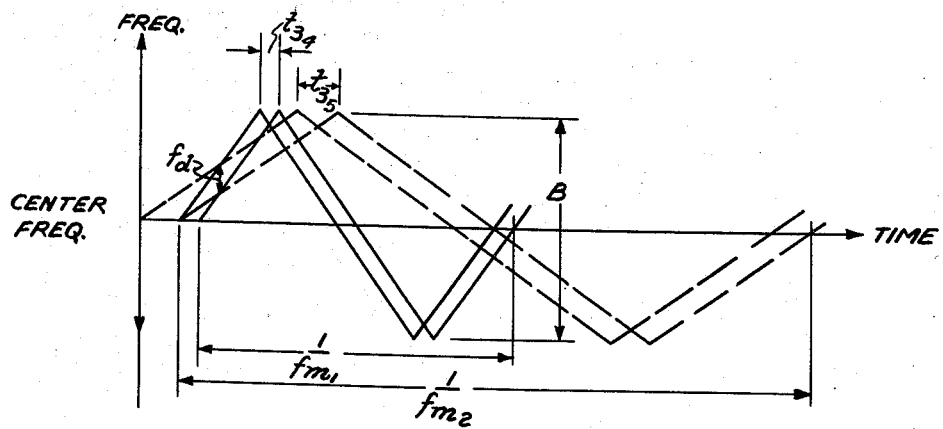

Referring to Figs. 4 and 5, there are shown in graph form in each figure two possible relations between the transmitted and reflected waves for two different altitudes represented, respectively, by the delay times $t_{3_1}$ and $t_{3_2}$ in Fig. 4 and $t_{3_4}$ and $t_{3_5}$ in Fig. 5. In Fig. 4, the transmitted and reflected waves for the first altitude are represented by the graphs $f_{s_1}$ and $f_{r_1}$, and the transmitted and reflected waves for the second altitude are represented by the graphs $f_{s_2}$ and $f_{r_2}$. The frequency difference $f_d$ between the two waves in both cases is maintained the same as indicated by changing the slope of the sweep frequency characteristic as the altitude changes. This change in slope can be effected either by changing the amplitude of the waveform of generator 11 or the recurrent frequency thereof. The resulting changes in output of transmitter 10 is shown in Figs. 4 and 5, respectively.

Assuming that the slope is to be varied by changing the frequency of the waveform of generator 11, then the direct current signal of the proper polarity from the discriminator 15 will change the frequency $f_m$ from the generator 11. On the other hand, if the slope of the sweep frequency characteristic from the transmitter 10 is to be controlled by changing the peak-to-peak excursion B, Fig. 4, the direct current signal from discriminator 15 will change the amplitude excursion of the modulation signal $f_m$ from generator 11 without changing its frequency.

For example, at altitude $h_1$ (corresponding to a time delay $t_{3_1}$) the $f_d$ signal is of the desired finite value. At a higher altitude, for example $h_2$ corresponding to the time delay $t_{3_2}$, the same $f_d$ signal is produced. The slope of the sweep frequency characteristic may be changed as follows:

for
$$h_1, \frac{f_d}{t_{3_1}} = \frac{B}{\frac{1}{2f_{m_1}}} = 2Bf_{m_1}$$

for
$$h_2, \frac{f_d}{t_{3_2}} = 2Bf_{m_2}$$

therefore
$$\frac{f_{m_2}}{f_{m_1}} = \frac{t_{3_1}}{t_{3_2}}$$

Therefore, the direct current signal from the discriminator 15 is automatically varied in polarity and magnitude so that the frequency of the modulation signal from generator 11 is correspondingly automatically varied so as to change the slope of the sweep frequency characteristic to maintain $f_d$ constant.

If the system were operated so as to maintain $f_d$ equal to zero, the delay $t_3$ would always be
$$\frac{1}{f_m}$$

or a full period of $f_m$. However, when the system is operated to maintain $f_d$ a constant finite value as above described, the delay time
$$t_3 = \frac{f_d}{2Bf_m}$$

The significance of this is that $f_m$ can be kept relatively low.

Figure 6:
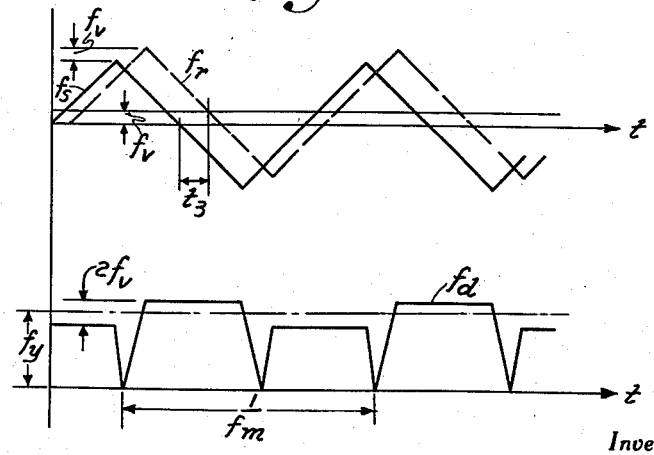
Figure 7:
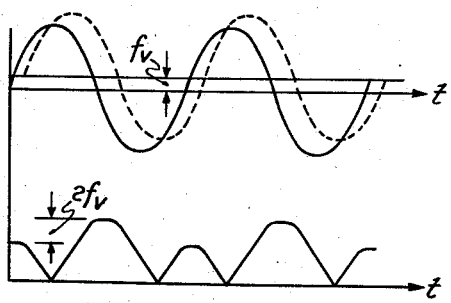
Figure 8:
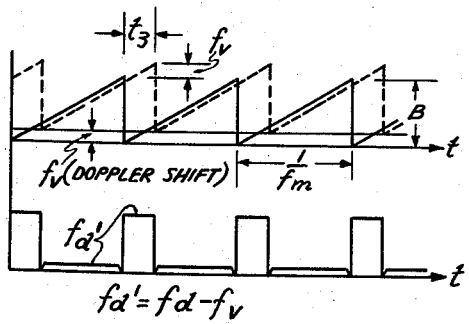

In the foregoing description, doppler effect has been assumed as negligible, and therefore, no variation due to doppler shift has been indicated. Referring to Figs. 6, 7 and 8, a doppler shift due to relative motion along the line of measurement such as between two aircrafts is indicated causing a displacement of the axis of symmetry of the reflected signal. In Figs. 6 to 8 wherein transmitted and received signals are indicated by $f_s$ and $f_r$, the same as in Figs. 2, 4 and 5, it will be recognized that the doppler shift $f_v$ shifts the axis of symmetry of the waveform $f_r$ with respect to the axis of symmetry of the transmitted waveform $f_s$. In Fig. 6, curve 32 indicates the resulting variations of $f_d$ with respect to time. The discriminator output tends to follow the $f_d$ curve if $f_m$ is much lower than $f_d$. The discriminator output in such case will be zero where $f_v = f_d$ and of a polarity depending on the sign of the difference $(f_v - f_d)$. If $f_m$ is greater than 20 cycles per second, for example, the indicator will average out this variation and will give a reading of $f_y = f_d - $av. The excursions of $f_d$ to zero may be neglected or if desired may be blanked out as described in connection with Figs. 1 and 2. If $f_m$ is much greater than $f_d$ the discriminator output will depend on the average value of $f_d$ and will not follow the rapid fluctuations to zero. If $f_d$ is close to $f_m$ in value difficulties may arise from beats and in this case operation must be such that the value of $f_m$ would not pass through the value of $f_d$. This region can be avoided in the system where $f_m$ is varied by proper choice of the excursion B and a value for $f_d$ with respect to the distance range to be covered. For a given $f_d$ a smaller B value increases the usable range starting from near zero. In the system where B is varied, $f_m$ can be chosen at some value far removed from the value of $f_d$.

Figure 9:
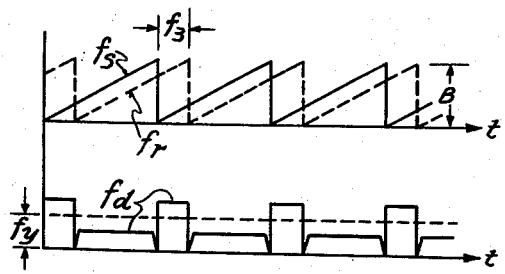

The example in Fig. 6 employs a triangular isosceles waveform while the example illustrated in Fig. 7 employs a sinusoidal wave and Figs. 8 and 9 illustrate use of sawtooth waves. These waveforms may be used regardless of whether altitude or distance is being measured. From the illustrations in Figs. 7 and 8, it is clear that doppler shift produces a corresponding effect. In the case of the sinusoidal waveform the values of $f_d$ and $f_m$ must be kept further apart to minimize the amplitude of beat components in the output of the system. Figs. 8 and 9 are included to illustrate the fact that non-symmetrical waveforms may be employed as well as symmetrical waveforms. The sawtooth wave is thus selected by way of example only. It is noted, however, that the non-symmetrical waveforms are less desirable where doppler shift is a substantial factor. Fig. 9 shows the sawtooth without doppler shift, while Fig. 8 shows the presence of doppler shift. In Fig. 8 the frequency difference is $f_d' = f_d - f_v$. The discriminator output during the period $t_3$ may be blanked out by the blanking wave 28 as previously described. With the sawtooth waveform the slope required to maintain $f_d$ constant depends on the doppler shift as well as the travel time for the transmitted and received frequencies. In the use of an unsymmetrical waveform, such as the sawtooth forms, the error effects of doppler shift cannot be completely averaged out. Therefore, symmetrical or nearly symmetrical waveforms are preferred.

If $f_m$ rather than B is controlled to keep $f_d$ constant, $f_m$ may be arranged to be in the audio range. In that case, the output of the generator 11 could also be used to produce an audible signal by means of an audio warning device 35 for warning or rough indication of terrain clearance. Approaching the ground or other such obstacle would cause the frequency $f_m$ to increase at an increasing rate. Such a rising tone may thus be used as an effective warning of insufficient clearance.

While I have disclosed the principles of my invention in connection with several different waveforms, it will be understood that these are given by way of example only and not as limiting the scope of the invention as set forth in the objects and the appended claims.

I claim:

1. A distance measuring system comprising a transmitter for transmitting frequency modulated waves over one transmission path of unknown distance and transmission time delay and simultaneously over another path of known transmission time delay, a receiver adapted to receive the waves over both of said paths, said receiver having means to detect the frequency difference between the waves received, a variable signal generator, means to apply the output of said generator to modulate the frequency of said transmitter, means responsive to changes in said frequency difference to vary the signal output of said generator to maintain said frequency difference of said waves at said given value, an indicator controlled by the output of said generator to indicate the distance of said one transmission path, means for generating a blanking signal commencing at a time established by said generator and enduring for an interval established by the output of said altitude indicator and means for applying said blanking signal to said means responsive to changes in said frequency difference.

2. In a frequency modulated radio altimeter having a modulation waveform generator and an altitude indicator and wherein the modulating signal is in the form of a triangle and the transmitted signal and received echo signal are mixed to yield a difference frequency used to control said indicator and indicative of altitude, means for blocking said difference frequency between the interval of time commencing with the peak of modulation of the transmitted signal and ending with the peak of modulation of the received signal, comprising pulse generator means coupled to the output of said modulation waveform generator for generating pulses coincident with the peaks of said modulation waveform, pulse forming means coupled to the output of said pulse generating means having pulse width control means coupled thereto and responsive to a signal from said indicator, gating means for controlling the transmission of said difference frequency signal to control said indicator and means for coupling the output of said pulse forming means to said gating means for blocking the transmission of said difference frequency signal to control said indicator.

3. A distance measuring system comprising a transmitter for transmitting frequency modulated waves over one transmission path of unknown transmission time delay and simultaneously over another path of known transmission time delay, a receiver adapted to receive the waves over both of said paths, said receiver having means to detect the frequency difference between the waves received, a signal generator adapted to produce a waveform having given excursions the slope of which is variable, means to apply the output of said generator to modulate the frequency of said transmitter to produce a rate of frequency variation according to the slope of characteristic of said excursions, means responsive to changes in said frequency difference from a given value to vary the rate of change in the slope characteristic of said excusions to maintain said frequency difference of said waves at said given value, a distance indicator controlled by the output of said generator to indicate the distance of said transmission path, and means under control of said waveform and said distance indicator to block the frequency difference output of said receiver during comparison of said waves outside of a portion of said excursion.

4. A frequency modulated radio altimeter for determining the altitude of an aircraft, comprising a frequency modulated radio transmitter and receiver located on said aircraft, a link of known transmission time delay between the output of said transmitter and said receiver, a generator adapted to produce an isosceles triangular waveform, said generator being coupled to said transmitter to modulate the frequency of the transmitter according to the linear excursions of said waveform, said transmitter transmitting said waves to the earth and said receiver receiving the reflections therefrom, said receiver having means to detect the frequency difference of the waves reflected from earth and those transmitted over said link, means responsive to change in said frequency difference from a predtermined finite value to cause said generating means to vary the slope characteristics of said waveform and thereby the frequency modulation of said transmitter to thereby return said frequency difference to said finite value, altitude indicating means responsive to the output of said generator, means for producing a blanking wave from the output of said generator as controlled by the output of said altitude indicator, and means to apply said blanking wave to said receiver to blank the portion of said frequency difference signal which varies between the crests of said waves.

References Cited in the file of this patent

UNITED STATES PATENTS

| | | |
|---|---|---|
| 2,256,539 | Alford | Sept. 23, 1941 |
| 2,268,587 | Guanella | Jan. 6, 1942 |
| 2,537,593 | Landon et al. | Jan. 9, 1951 |
| 2,553,907 | Fleming-Williams et al. | May 22, 1951 |
| 2,724,828 | Dunn | Nov. 22, 1955 |